(12) United States Patent
Terada

(10) Patent No.: US 6,590,306 B2
(45) Date of Patent: Jul. 8, 2003

(54) ELECTRIC MOTOR DRIVEN WHEEL

(75) Inventor: Junji Terada, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 09/683,698

(22) Filed: Feb. 5, 2002

(65) Prior Publication Data

US 2002/0117916 A1 Aug. 29, 2002

(30) Foreign Application Priority Data

Feb. 26, 2001 (JP) ....................................... 2001-050379
Feb. 26, 2001 (JP) ....................................... 2001-050464
Feb. 26, 2001 (JP) ....................................... 2001-050538

(51) Int. Cl.$^7$ ................................................ H02K 7/10
(52) U.S. Cl. ................. 310/75 C; 310/67 R; 310/67 A; 310/89
(58) Field of Search ............................. 310/67 R, 67 A, 310/64, 75 C, 75 R, 76–78, 83, 89; 180/65.1–65.8, 220, 291

(56) References Cited

U.S. PATENT DOCUMENTS 5,691,584 A * 11/1997 Toide et al. ............... 310/67 R
6,276,481 B1 * 8/2001 Matsuto et al. ............. 180/220

* cited by examiner

Primary Examiner—Thanh Lam
(74) Attorney, Agent, or Firm—Ernest A Beutler

(57) ABSTRACT

A motor scooter embodying an improved electric motor driven wheel. The electric motor for driving the wheel is quite compact and is designed so as to be nested within the disk of the wheel. The motor controller is mounted adjacent the wheel in a protected area but is cooled by airflow across it and by heat transfer to the motor housing. Oil in the motor assembly also will cool the controller. A two speed planetary gear transmission is employed that also is compact and can be nested easily within portions of the electric motor. In addition, an improved brake assembly is also mounted integrally within the motor driving mechanism.

35 Claims, 4 Drawing Sheets

ELECTRIC MOTOR DRIVEN WHEEL

BACKGROUND OF INVENTION

This invention relates to an electric motor driven wheel and more particularly to an improved, compact electric motor for driving such a wheel.

A wide variety of vehicles are provided with electric motors for their drive. In one preferred form of such arrangement, the electric motor is incorporated into a part of the wheel construction so as to provide a very compact arrangement. That is, it is desirable to make the electronic motor compact enough so that it can be nested at least in part into the wheel so as to provide a neat and yet highly serviceable assembly.

Generally, the electric motor includes a rotor and a stator, one of which carries a plurality of permanent magnets and the other of which carries a plurality of electrical coils that cooperate with the magnets. Electrical power is delivered to the coils in sequential fashion so as to effect rotation of the rotor and this rotation is used to drive the wheel.

Normally, the flow of current through the electrical coils is controlled by an electric power control for sequentially energizing the coils and this is in the form of an electrical power controlling inverter that is formed of a plurality of FETs' that switch the power supply to the coils. The inverter is generally arranged so that the switching elements such as the FETs' are mounted on a substrate. In addition, charging capacitors, current detecting sensors and power supply cables for sending and receiving signals between the controllers and a CPU are connected to the various terminals on the substrate. However, with this type of arrangement, the switching action of the FETs' causes them to develop heat and further heat is generated from the coils of the electric motor. If the construction is compact, the heat generated can cause some problems and thus, previously proposed systems have not been as compact as desired.

It is, therefore, a principal object to this invention to provide an improved and compact electric motor for driving a wheel wherein the motor elements are arranged so that the controller is well insulated from the heat generated by the motor operation.

In connection with such electric motor driven wheels, the output of the electric motor generally is such that it is desirable to include an arrangement that incorporates a speed changing transmission for increasing the torque at lower speeds and loads and for permitting high speed operation as the vehicle has been accelerated. Obviously, it is difficult with such compact constructions to incorporate such a transmission mechanism and the control for it.

It is, therefore, a still further object to this invention to provide an improved and compact transmission arrangement for use integrally with an electric motor for driving a wheel and providing a compact construction.

In addition to the necessity for a transmission, it is also generally the practice to provide some type of brake for the electric motor driven wheel. It is particularly advantageous if this brake can be incorporated into the electric driving motor, however this still aggravates the problem in maintaining a compact construction.

An advantage with incorporating the brake within the driving motor is that it eliminates the need for having a separate braking element that is fixed to the wheel and the associated frictional mechanism for braking this rotating member.

It is, therefore, a still further object to this invention to provide an improved and compact electric motor for driving a wheel that incorporates a braking system within it.

SUMMARY OF INVENTION

The various features of this invention are adapted to be embodied in an electric motor arrangement for driving an associated, juxtaposed wheel. The electric motor is comprised of a rotor and a stator, which are supported for relative rotation. One of rotor and stator carry a plurality of spaced permanent magnets and the other carries a plurality of coil windings that are juxtaposed to the permanent magnets for effecting rotation of the rotor. A motor cover encloses the rotor and the stator and is adapted to extend at least in part into the associated wheel.

In accordance with a first feature of the invention, a wheel driving shaft is driven by the rotor and has an end portion extending through an opening in the motor cover for driving the associated wheel. The motor cover opening is surrounded by a disk shape portion and a controller for controlling the supply of electric power to the coils is mounted on the side of the disk shape portion through which the wheel driving shaft extends.

In accordance with a second feature of the invention, the rotor is comprised of a cup shape member having a cylindrical portion closed at one end by a circular end wall through which the wheel driving shaft passes. A first reduction gear set is provided on one side of the circular end wall for driving the wheel driving shaft from the rotor at a first speed ratio and is disposed axially within the cylindrical portion. A second reduction gear set is disposed on the other side of the circular end wall for the driving wheel driving shaft from the rotor at a second speed ratio that is different from the first speed ratio.

In accordance with yet a third feature of the invention, the wheel driving shaft has a first end portion that extends through an opening in one side of the motor cover for driving the associated wheel. The wheel driving shaft has a second portion extending through an opening in the other side of the motor cover and a braking device is associated with the wheel driving shaft second end portion for braking the rotation of the wheel driving shaft and the associated wheel.

DETAILED DESCRIPTION

Figure 1:
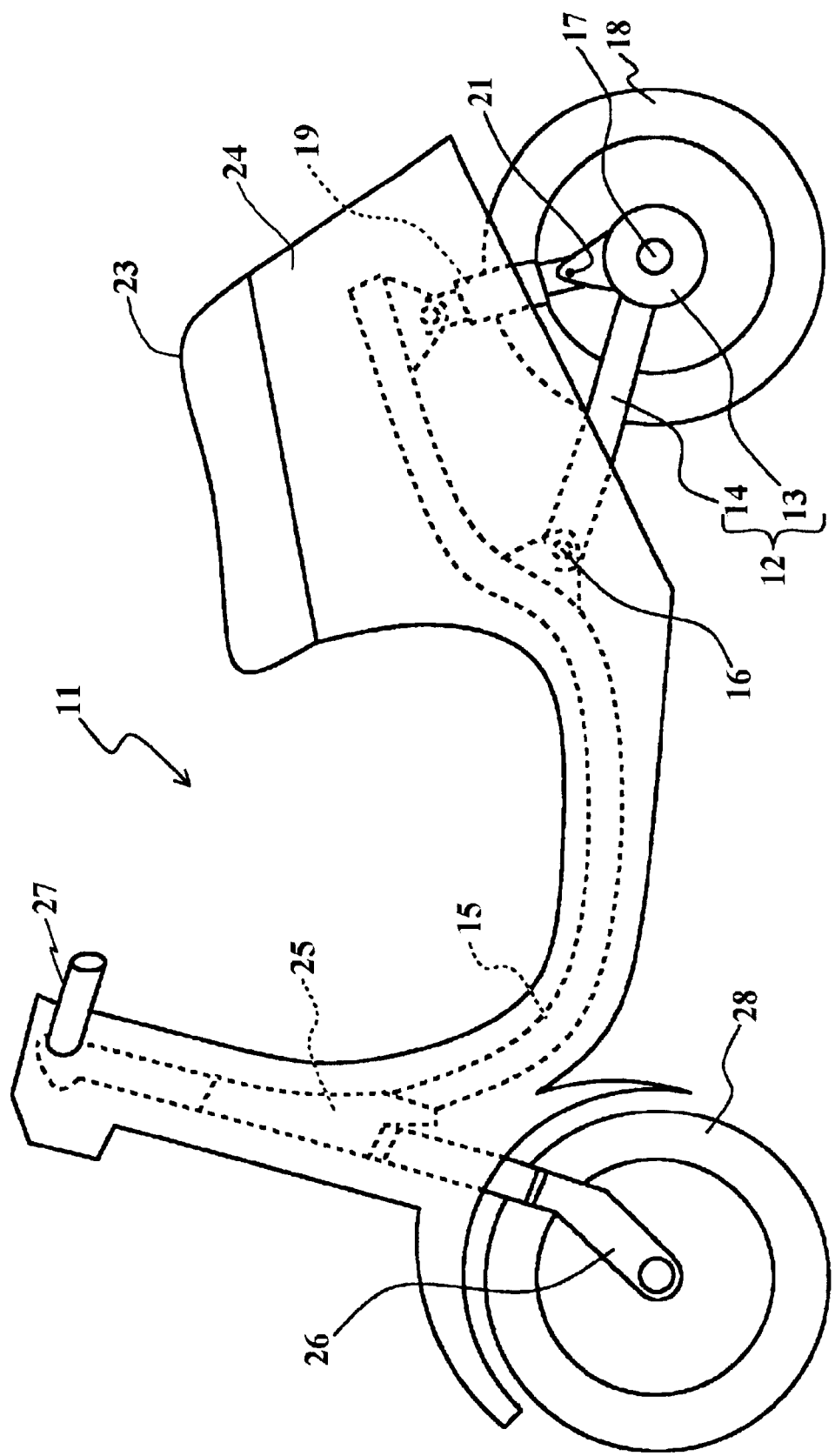
FIG. 1 is a side elevational view of a motor scooter constructed in accordance with an embodiment of the invention.

Referring now in detail to the drawings and initially primarily to FIG. 1, a motor scooter is illustrated generally and is depicted by the reference numeral 11. The invention is disclosed in conjunction with a motor scooter because this is typical of the types of vehicles which may be driven by an electric motor arrangement incorporating the invention and which is indicated generally by the reference numeral 12.

This electric motor arrangement 12 includes an electric motor assembly 13, which forms a portion of a trailing arm assembly 14. The trailing arm assembly 14 is pivotally journalled on a main frame tube 15 by a pivot joint 16. As will become apparent, the electric motor assembly 13 has an output shaft 17, which drives a rear wheel 18.

The suspension for the trailing arm assembly 14 and rear wheel 18 includes a cushioning unit, indicated by the reference numeral 19, and which has a pivotal connection 21 to a trunion portion 22 of the housing for the electric motor assembly 13 as will be described in more detail later. This suspension system including the cushioning unit 19 is positioned beneath a seat 23 mounted on a body assembly 24 that is fixed in a suitable manner to the main frame tube 15.

The main frame tube 15 carries, at its forward end, a head pipe 25 which journals a front fork 26. The front fork 26 is steered by means of a handlebar assembly 27 carried at its upper end and operated by a rider seated on the seat 23. A front wheel 28 is journalled at the lower end of the front fork 26 in any suitable manner.

Figure 2:
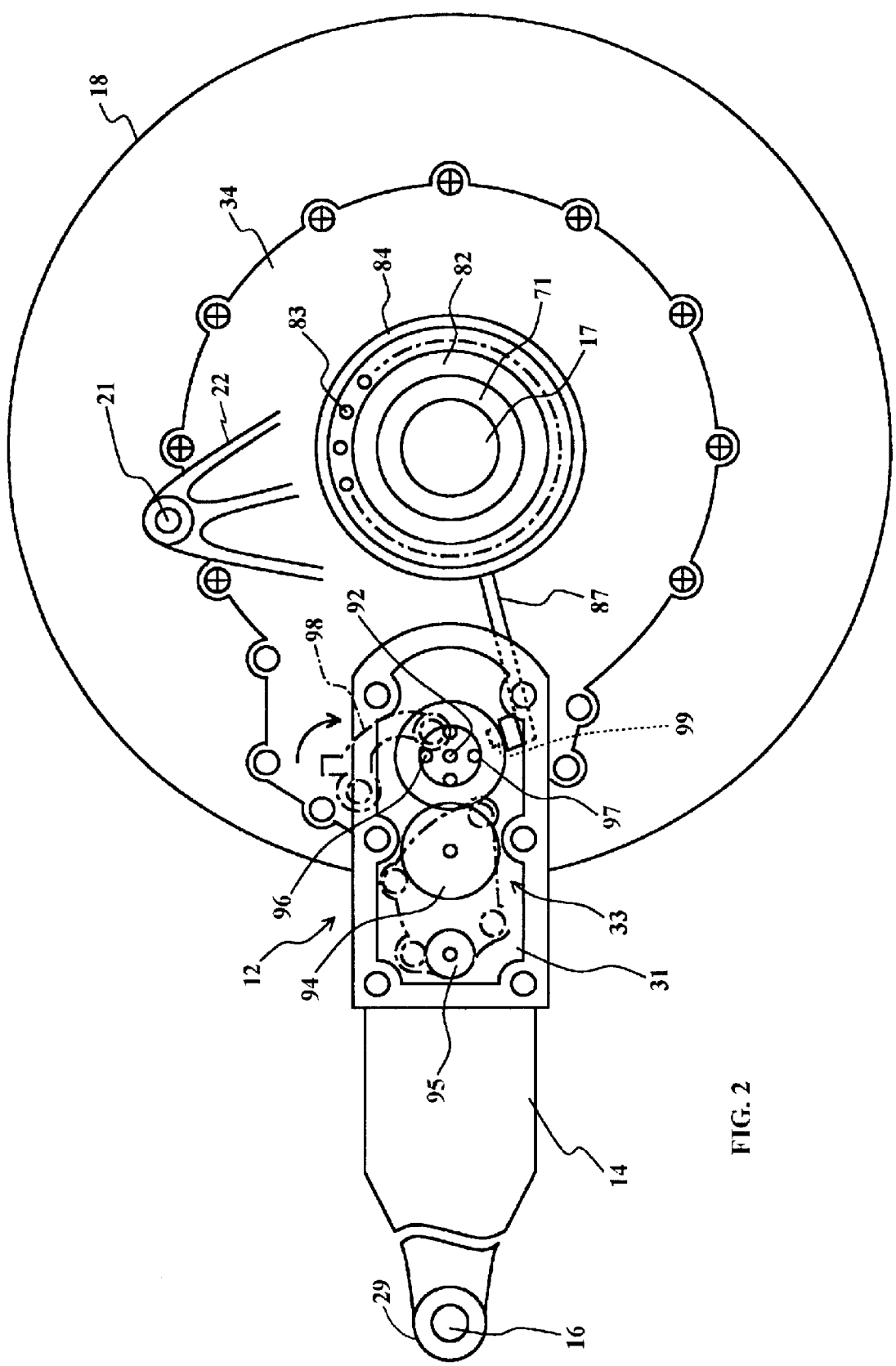
FIG. 2 is an enlarged side elevational view of the wheel driving electric motor, the associated wheel and its integral trailing arms support for the wheel.
Figure 3:
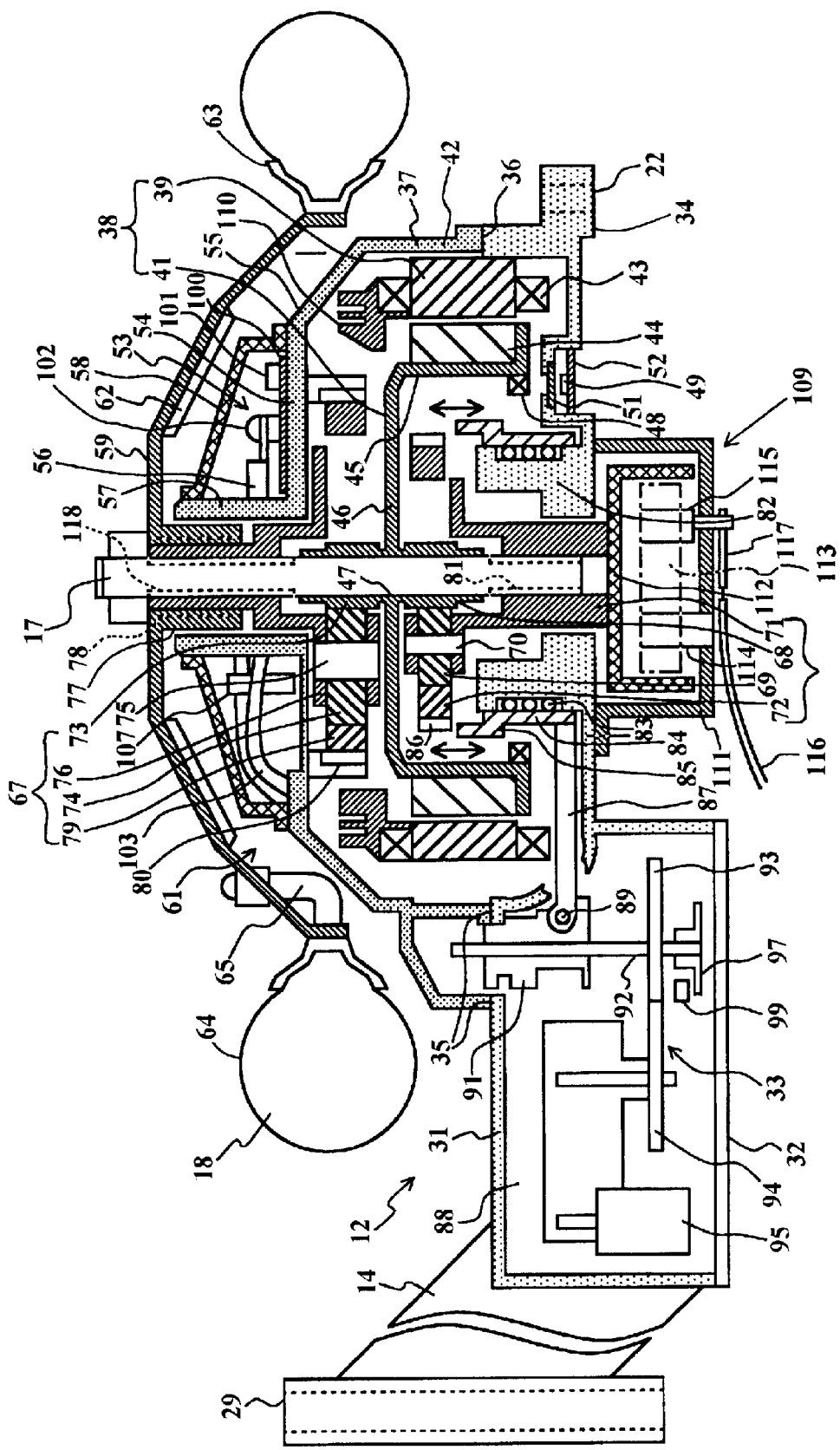
FIG. 3 is an enlarged cross sectional view of the structure shown in FIG. 2 taken a horizontal plane.

Referring now primarily to FIGS. 2 and 3, it will be seen from these figures that the trailing arm assembly 14 has a tubular front portion 29 through which the pivot joint 16 extends. The trailing arm assembly 14 extends rearwardly from the tubular front portion 29 and defines a transmission selector housing portion 31 that is closed at its outer end by an end plate 32. A transmission shift control mechanism, indicated generally by the reference numeral 33, is contained in the transmission selector housing portion 31. This transmission shift control mechanism 33 will be described in more detail later.

At the rear end of the trailing arm assembly 14, there is formed a motor housing for the electric motor assembly 13. This motor housing is defined by a generally cylindrical portion 34, of the trailing arm assembly 14 and which has facing surfaces 35 that are engaged by like facing surfaces 36 of a motor housing closure 37.

This defines an internal cavity in which an electric motor, indicated generally by the reference numeral 38, and comprised of a stator 39 and rotor 41 is positioned. The stator 39 is comprised of a plurality of coil armature poles 42 that are joined at one end by a circumferential ring and around each of which electric coil windings 43 are provided. The coil windings 43 are energized in a manner, which will be described shortly.

The coil windings 43 and armature poles 42 surround a plurality of permanent magnets 44 that are fixed on a cylindrical outer surface formed by a cylindrical outer wall 45 of the rotor 41. The rotor 41, which has generally, a cup shape. To this end, one end of the cylindrical outer wall 45 is closed by a generally disk shape wall 46 of the rotor 41. This has an opening 47 through which the axial output shaft 17 of the electric motor assembly 13 passes.

Detecting magnets 48 are positioned at aligned integrals with the permanent magnets 44 on the inner surface of the cylindrical outer wall 45. The housing generally cylindrical portion 34 has a windowed opening and mounts a sensor 49, which reads the detecting magnets 48 through a window 51. A closure plate 52 encloses the sensor 49.

The sensor 49 provides signals to an electrical controller 53 that is mounted on an end surface 54 of the motor housing closure 37. This end surface 54 is generally of a disk shape and is joined to the cylindrical outer wall of the motor housing closure 37 by a beveled or frustro-conical shaped portion 55. This construction permits the motor housing and specifically the motor housing closure 37 to be nested within the disk shaped portion 56 of the wheel 18.

The inner peripheral end of the end surface 54 has a cylindrical extension 57 that journals the motor output shaft 17 in a manner, which will be described later. In addition, the hub of the wheel 18 also extends into this cylindrical extension 57 and is journalled by suitable bearings or bushings. This bearing and the associated seal structure is not illustrated because it may be of any known type. The included oil seals allow the motor housing to be filled with at least partially lubricant. This lubricant will collect at its lower end.

The controller 53 is mounted in this area and is covered by a cover plate 58, which has a shape complimentary to the inner surface of the rear wheel 18. To this end, the wheel 18 is provided with a disk shaped portion 59 that has a shape generally complimentary to the outer portion of the motor housing closure 37 and the cover plate 58. This defines an air gap 61 in this area.

The disk shaped portion 59 of the wheel 18 is formed with fins 62 that acts as cooling fan blades to draw air into the air gap 61 between the disk shaped portion 59 and specifically a rim 63 thereof for cooling the controller 53. A pneumatic tire 64 is mounted on the rim 63 in a known manner and has fill valve assembly 65 for inflation thereof. The fill valve assembly 65 is disposed in the air gap 61 and at an area in proximity to the beveled or frustro-conical shaped portion 55 of the motor housing closure 37 so as to provide adequate clearance as well as cooling airflow.

The manner by which the rotor 41 of the electric motor 38 drives the output shaft 17 will now be described by primary reference to FIG. 3. This drive includes first and second planetary transmissions, indicated generally by the reference numerals 66 and 67, respectively. These two planetary transmissions 66 and 67 are constructed to provide a compact arrangement and nevertheless one that permits the motor output shaft 17 and wheel 18 to be driven at any of two different, selected speed ratios.

Referring first to the first planetary transmission 66, this provides the lower numerical ratio of drive between the rotor 41 and the motor output shaft 17. This first planetary transmission 66 is comprised of a sun gear 68, which is formed, integrally with the portion of the rotor 46 that defines the opening 47. This sun gear 68 is enmeshed with a plurality of planet gears 69 that are rotatably mounted on a carrier 71 by means of shafts 70. Although only one planet gear 69 and shaft 70 appears in the drawings, preferably three planet gears 69 may be employed.

The outer peripheral edges of the planet gears 69 are engaged with a ring gear 72. The ring gear 72 is adapted to be selectively braked or permitted for rotation by means of the transmission shift control mechanism 33 in a manner, which will be described shortly.

It should be noted that because of its lower numerical ratio, the first planetary transmission 66 and specifically its ring gear 72 can have a relatively small diameter and thus be nested within the cylindrical outer wall 45 of the rotor 41. This structure is also positioned inwardly of the detecting magnets 48 and thus, the arrangement can be made quite compact.

Referring now to the second, higher numerical ratio planetary transmission 67, it comprises a sun gear 73, which is formed integrally with the sun gear 68 and the rotor portion that defines the opening 47. This sun gear 73 is enmeshed with a plurality of planet gears 74 that are journalled on shafts 75. The shafts 75 are, in turn, affixed to a carrier 76, which has a cylindrical portion that is journalled in the motor housing cylindrical extension 57 by suitable bearings and seals, which are not shown. Again only one planet gear 74 and shaft 75 are shown, three may be utilized. This carrier cylindrical portion also extends through a hub 77 of the wheel 18 and has a splined connection thereto indicated at 78 so as to establish a driving relationship with the wheel 18.

The planet gears 74 are enmeshed with a ring gear 79. The ring gear 79 is connected by means of a one-way or overrunning clutch 80 to the motor housing closure 37, for a purpose to be described.

The carrier 71 of the first planetary transmission 66 has a splined driving connection 81 to the motor output shaft 17. However, when the carrier 71 is not braked, it will freewheel and the wheel 18 will be driven at a relatively high numerical speed ratio from the second planetary transmission 67 for amplifying the torque exerted by the electric motor 38 on the output shaft 17 and wheel 18.

Once the vehicle has accelerated to an appropriate speed, the transmission is shifted by the transmission shift control mechanism 33, now to be described, so as to brake the rotation of the ring gear 72. When this occurs, the output shaft 17 will be driven at a higher speed and the one-way clutch 80 will overrun so that the ring gear 79 of the second planetary transmission 67 can rotate freely and permit this change in transmission ratio.

The generally cylindrical portion 34 of the electric motor has an inwardly extending projection 82 that journals the carrier 71 and, accordingly, the inner end of the motor output shaft 17. Again, the bearings and oil seals associated with this arrangement are not illustrated.

This projection 82 also carries a plurality of ball bearings 83 that journal a shift sleeve 84 for axial movement in a direction indicated by the double headed arrows in FIG. 3. The shift sleeve 84 has a plurality of projections 85 that are adapted to be brought into engagement with teeth 86 formed on the outer periphery of the ring gear 72 so as to brake its rotation.

An actuating lever 87 extends from the shift sleeve 84 into a cavity 88 formed by the transmission selector housing portion 31 and closed by the end plate 32. The inner end of this actuating lever 87 carries a pin 89 that is engaged in a cam slot formed in a shift actuating cam member 91. When this shift actuating cam member 91 is rotated, the shift sleeve 84 will be moved from the disengaged position shown in FIG. 3 to the engaged position where its projections 85 engage between the teeth 86 formed in the carrier 72 so as to brake its rotation.

The shift actuating cam member 91 is affixed to a camshaft 92 that is suitably journalled within the cavity 88 and which has a driven gear 93 that is enmeshed with a driving gear 94. The camshaft 92 and driving gear 94 are suitably journalled within the transmission selector housing portion 31. An electric motor 95 controlled by the vehicle operator drives the gear 94 through a reduction gear train (not shown).

A detent mechanism best shown in FIG. 2 retains the camshaft 92 in one of four circumferentially spaced positions. This detent mechanism comprises a plurality of pins 96 carried by a detector wheel 97 fixed to one end of the camshaft 92. A spring biased locking arm, shown in phantom in FIG. 2 and identified by the reference numeral 98, operates so as to hold the shift actuating cam member 91 in one of four selected positions.

A signal is given to indicate the position of the shift actuating cam member 91 by means of a detector 99 that is mounted in proximity to the detector wheel 97 and cooperates with a suitable detecting portion thereof. A suitable operator control is positioned in proximity to the handlebar assembly 27 or at any other suitable location for operation by the rider seated on the seat 23 to accomplish the shift between the transmission ratios.

Figure 4:
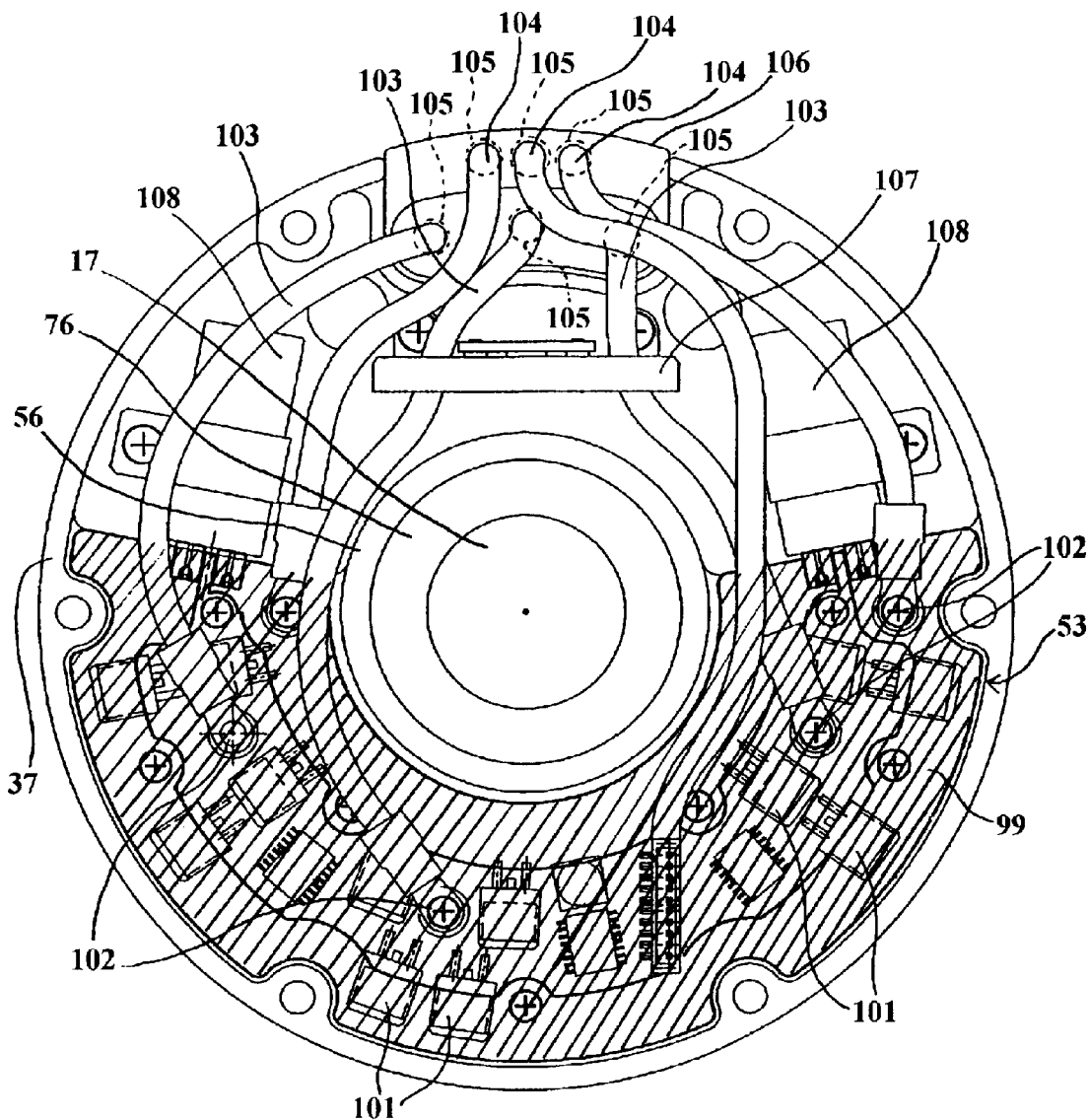
FIG. 4 is a view showing components of the electric motor looking in a direction opposite to that of FIG. 2 and with portions broken away so as to more clearly show the wiring arrangement.

The speed control arrangement for the electric motor 38 will now be described my primary reference to FIGS. 3 and 4. It has been previously noted that the controller 53 is positioned within the cover plate 58 for cooling and protection reasons. This controller 53 is comprised of a number of components, these include a substrate 100 that is preferably formed from a highly heat conductive material such as aluminum or an alloy thereof. This may be bonded to the end surface 54 of the motor housing closure 37 to improve heat transfer. Alternatively or in addition, the portion of the end surface 54 on to which the substrate 100 is mounted made be made thicker so as to further improve heat transfer from the controller 53 to the atmosphere with the added cooling generated by the fins 62.

If the substrate is formed from a non-conductive material, then certain of the electrical components can have mechanical connection directly to the motor housing closure 37 for improved heat transfer.

Mounted on the substrate 100 is an inverter that comprises a plurality of switching FETs' 101. It should be noted that this construction as shown in FIG. 4 is located on the lower portion of the motor housing closure 37 and hence, will be contacted on its backside by the oil in the motor casing and thus, additional cooling will be provided.

Connecting terminals 102 are provided also here and cables 103 are routed from these terminals 102 to appropriate series of the coil windings 43. These cables 103 have end portions 104 that pass through openings 105 in an insulator block 106 that is provided in a window formed on the peripheral edge of the motor housing closure 37 at a relatively high location so as to be clear of the oil that may be contained within the interior thereof. The winding assembly as illustrated is intended to be utilized in conjunction with a three-phase electrical motor although other types of arrangements can be utilized.

Also mounted in this area is provided a current sensor 107 for sensing the current flow to and from the motor and a pair of voltage charging electrical capacitor arrangements 108. A collector 110 on the armature windings 43 transmits the electrical power thereto.

Referring now again to FIG. 3, in addition to providing the compact motor arrangement and mounting for its controller and change speed transmission, the driving arrangement also includes a brake assembly, indicated generally by the reference numeral 109 and which is positioned within a brake housing 111 that is mounted on the side of the motor housing and specifically the generally cylindrical portion 34 opposite to the wheel 18. This brake assembly 109 may be of either the disc or drum type brake and the latter is illustrated.

This includes a brake drum 112 that is fixed for rotation with the carrier 71, which is, in turn, coupled by the splined connection 81 to the wheel driving output shaft 17. The internal surface of this brake drum is adapted to be engaged by a brake shoe 113 that is pivotally mounted on the brake housing member 111 by means of a pivot pin or anchor 114.

An actuating cam 115 is pivotally mounted on the cover 111 and is actuated by a brake cable 116 and actuating lever 117 formed on the actuating cam under the operator's control so as to halt the rotation of the wheel 18 under the control of the operator. Since the carrier 76 of the second planetary transmission drives the wheel 18 directly, a splined connection 118 is provided between the carrier 76 and the output shaft 17 so that the brake 109 will also act on the wheel 18 when the first planetary transmission 66 is free wheeling.

As has been previously noted, a disc type brake can also be utilized for this arrangement and this eliminates the need for other types of external mounting for the brake assembly.

Thus, from the foregoing description, it should be readily apparent that the described wheel driving electric motor and trailing arm assembly provides a very compact construction and one which will have good life due to the cooling of the controller for the motor as well as a compact change speed arrangement and braking device. Of course, the foregoing description is that of preferred embodiments of the invention and various changes and modifications made be without departing from the spirit and scope of the invention, as defined by the appended claims.

What is claimed is:

1. An electric motor arrangement for driving an associated, juxtaposed wheel comprised of a rim portion mounting a tire and a disk shaped portion, said electric motor comprising a rotor and a stator supported for relative rotation, one of said rotor and said stator carrying a plurality of spaced permanent magnets, the other of said rotor and said stator carrying a plurality of coil windings juxtaposed to said permanent magnets for effecting rotation of said rotor, a motor cover enclosing said rotor and said stator and adapted to extend at least in part into the associated wheel, a wheel driving shaft driven by said rotor and having an end portion extending through an opening in said motor cover for driving the associated wheel, said motor cover opening being surrounded by a disk shaped portion facing and juxtaposed to said disk shaped portion of said wheel, and a controller for controlling the supply of electrical power to said coils mounted on the side of said disk shaped portion facing said disk shaped portion of said wheel and through which said wheel driving shaft extends.

2. An electric motor arrangement as set forth in claim 1, wherein the controller comprises an inverter with switching elements mounted on a substrate.

3. An electric motor arrangement as set forth in claim 2, wherein the substrate extends around a portion of the disk shaped portion around the wheel driving shaft.

4. An electric motor arrangement as set forth in claim 3, in combination with the associated wheel and wherein the disk shaped portion of said associated wheel is formed with fins juxtaposed to the controller acting as fan blades for cooling said controller.

5. An electric motor arrangement as set forth in claim 3, wherein a controller cover is fixed to the motor cover disk shaped portion for enclosing the controller.

6. An electric motor arrangement as set forth in claim 5, wherein the disk shaped portion of the motor cover extends perpendicularly to the axis of the wheel driving shaft and is connected at its radially outer periphery to the cylindrical portion by a conically inclined portion so that the controller is positioned radially inwardly of the ground engaging portion of the associated wheel.

7. An electric motor arrangement as set forth in claim 3, in combination with the associated wheel and wherein the disk shaped portion of said associated wheel is formed with fins juxtaposed to the controller acting as fan blades for cooling said controller.

8. An electric motor arrangement as set forth in claim 2, wherein the substrate is bonded to the disk shaped portion.

9. An electric motor arrangement as set forth in claim 8, wherein the motor cover is at least partially filled with lubricant.

10. An electric motor arrangement as set forth in claim 9, wherein the substrate extends around a lower portion of the disk shaped portion and around the wheel driving shaft.

11. An electric motor arrangement as set forth in claim 1, wherein the rotor has a circular end wall through which the wheel driving shaft extends and said wheel driving shaft has a second end portion extending through an opening in the other side of the motor cover, and further including a braking device associated with said wheel driving shaft second end portion for braking the rotation of said wheel driving shaft and the associated wheel.

12. An electric motor arrangement as set forth in claim 11, wherein the motor cover forms at least a portion of a trailing arm for suspending the associated wheel for suspension movement relative to a vehicle frame.

13. An electric motor arrangement as set forth in claim 12, wherein the motor cover forms an extension for pivotal connection to a cushioning element.

14. An electric motor arrangement for driving an associated, juxtaposed wheel, said electric motor comprising a rotor and a stator supported for relative rotation, one of said rotor and said stator carrying a plurality of spaced permanent magnets, the other of said rotor and said stator carrying a plurality of coil windings juxtaposed to said permanent magnets for effecting rotation of said rotor, a motor cover enclosing said rotor and said stator and adapted to extend at least in part into the associated wheel, a wheel driving shaft driven by said rotor and having an end portion extending through an opening in said motor cover for driving the associated wheel, said motor cover opening being surrounded by a disk shaped portion, and a controller for controlling the supply of electrical power to said coils mounted on the side of said disk shaped portion through which said wheel driving shaft extends, said motor cover forming at least a portion of a trailing arm for suspending the associated wheel for suspension movement relative to a vehicle frame.

15. An electric motor arrangement as set forth in claim 14, wherein the motor cover forms an extension for pivotal connection to a cushioning element.

16. An electric motor arrangement for driving an associated, juxtaposed wheel, said electric motor comprising a rotor and a stator supported for relative rotation, one of said rotor and said stator carrying a plurality of spaced permanent magnets, the other of said rotor and said stator carrying a plurality of coil windings juxtaposed to said permanent magnets for effecting rotation of said rotor, a motor cover enclosing said rotor and said stator and adapted to extend at least in part into the associated wheel, a wheel driving shaft driven by said rotor and having an end portion extending through an opening in said motor cover for driving the associated wheel, said motor cover opening being surrounded by a disk shaped portion, and a controller for controlling the supply of electrical power to said coils mounted on the side of said disk shaped portion through which said wheel driving shaft extends, said rotor having a circular end wall through which said wheel driving shaft extends and further including a first reduction gear set on one side of the circular end wall for driving the wheel driving shaft from the rotor at a first speed ratio and disposed axially within the cylindrical portion, and a second reduction gear set on the other side of said circular end wall for driving said wheel driving shaft from said rotor at a second speed ratio different from said first speed ratio.

17. An electric motor arrangement as set forth in claim 16, wherein the wheel driving shaft has a second end portion extending through an opening in the other side of the motor cover, and a braking device associated with said wheel driving shaft second end portion for braking the rotation of said wheel driving shaft and the associated wheel.

18. An electric motor arrangement as set forth in claim 16 further including a transmission control for controlling which reduction gear set drives the associated wheel from the rotor.

19. An electric motor arrangement for driving an associated, juxtaposed wheel, said electric motor comprising a rotor and a stator supported for relative rotation, one of said rotor and said stator carrying a plurality of spaced permanent magnets, the other of said rotor and said stator carrying a plurality of coil windings juxtaposed to said permanent magnets for effecting rotation of said rotor, said rotor being comprised of a cup shaped member having a cylindrical portion closed at one end by a circular end wall through which a wheel driving shaft passes for driving the associated wheel, a first reduction gear set on one side of said circular end wall for driving said wheel driving shaft from said rotor at a first speed ratio and disposed axially within said cylindrical portion, and a second reduction gear set on the other side of said circular end wall for driving said wheel driving shaft from said rotor at a second speed ratio different from said first speed ratio.

20. An electric motor arrangement as set forth in claim 19, wherein at least one of the reduction gear sets comprises a planetary transmission.

21. An electric motor arrangement as set forth in claim 20, wherein the sun gear of the at least one of the reduction gear sets is directly driven by the rotor.

22. An electric motor arrangement as set forth in claim 19, wherein both of the reduction gear sets comprise planetary transmissions.

23. An electric motor arrangement as set forth in claim 22, wherein the sun gears of both of the reduction gear sets are directly driven by the rotor.

24. An electric motor arrangement as set forth in claim 23, wherein the sun gears of both of the reduction gear sets are formed integrally with each other and the rotor circular end wall.

25. An electric motor arrangement as set forth in claim 22, further comprising a transmission control selectively determining which of the planetary transmissions drives the wheel driving shaft.

26. An electric motor arrangement as set forth in claim 25, wherein the ring gear of the planetary transmission nearest axially to the associated wheel has a greater diameter than the other planetary transmission.

27. An electric motor arrangement as set forth in claim 22, wherein the outer diameter of the ring gear of the first reduction gear set is disposed axially within the rotor cylindrical portion.

28. An electric motor arrangement as set forth in claim 27, wherein the outer diameter of the ring gear of the second reduction gear set is almost equal to the diameter of the rotor cylindrical portion.

29. An electric motor arrangement as set forth in claim 22, wherein the speed reduction of the planetary transmission nearest axially to the associated wheel is greater than the speed reduction of the other planetary transmission.

30. An electric motor arrangement as set forth in claim 29, further comprising a transmission control selectively determining which of the planetary transmissions drives the wheel driving shaft.

31. An electric motor arrangement as set forth in claim 30, wherein the sun gears of both of the reduction gear sets are directly driven by the rotor.

32. An electric motor arrangement as set forth in claim 31, wherein planetary carriers of both of the reduction gear sets are connected to drive the wheel driving shaft and the transmission control selectively determines which of the planetary transmissions drives the wheel driving shaft by selectively braking the rotation of the ring gear of the other planetary transmission and an overrunning clutch operatively interposed between the ring gear of the planetary transmission nearest axially to the associated wheel and the stator.

33. An electric motor arrangement as set forth in claim 19, wherein the motor cover forms at least a portion of a trailing arm for suspending the associated wheel for suspension movement relative to a vehicle frame.

34. An electric motor arrangement as set forth in claim 33, wherein the motor cover forms an extension for pivotal connection to a cushioning element.

35. An electric motor arrangement as set forth in claim 19 further including a transmission control for controlling which reduction gear set drives the associated wheel from the rotor.

* * * * *